(12) United States Patent
Winiecki et al.

(10) Patent No.: US 11,800,372 B2
(45) Date of Patent: Oct. 24, 2023

(54) ANTENNA ARRAY INSTALLATION

(71) Applicant: Sequans Communications S.A., Colombes (FR)

(72) Inventors: Thomas Winiecki, Reading (GB); James Watts, Colombes (FR)

(73) Assignee: Sequans Communications S.A., Colombes (FR)

( * ) Notice: Subject to any disclaimer, the term of this patent is extended or adjusted under 35 U.S.C. 154(b) by 424 days.

(21) Appl. No.: 17/071,770

(22) Filed: Oct. 15, 2020

(65) Prior Publication Data

US 2022/0124512 A1     Apr. 21, 2022

(51) Int. Cl.
| | |
|---|---|
| *H04W 16/18* | (2009.01) |
| *H01Q 1/12* | (2006.01) |
| *G09B 5/02* | (2006.01) |
| *H04B 17/327* | (2015.01) |
| *H04B 17/23* | (2015.01) |

(52) U.S. Cl.
CPC .............. *H04W 16/18* (2013.01); *G09B 5/02* (2013.01); *H01Q 1/1257* (2013.01); *H04B 17/23* (2015.01); *H04B 17/327* (2015.01)

(58) Field of Classification Search
None
See application file for complete search history.

(56) References Cited

U.S. PATENT DOCUMENTS

| | | | | |
|---|---|---|---|---|
| 1,052,434 | A * | 2/1913 | Donaldson | B07B 1/10 |
| | | | | 209/420 |
| 2019/0325723 | A1* | 10/2019 | Imamura | H04W 4/027 |
| 2020/0161757 | A1* | 5/2020 | Henry | H01Q 21/20 |
| 2022/0150717 | A1* | 5/2022 | Geng | H01Q 15/14 |
| 2022/0248340 | A1* | 8/2022 | Miyatake | H04B 17/345 |
| 2023/0133382 | A1* | 5/2023 | Kalantari | H04B 7/0695 |
| | | | | 375/262 |

* cited by examiner

*Primary Examiner* — Wilson Lee
(74) *Attorney, Agent, or Firm* — Hamilton, Brook, Smith & Reynolds, P.C.

(57) ABSTRACT

The present disclosure relates to a method for installation of a phased array antenna receiving a signal, the method comprising: determining that a higher directivity of the phased array antenna is achievable; determining an orientation of the phased array antenna at which the higher directivity is achievable; and providing instructions for adjusting the orientation of the phased array antenna from an initial orientation to the determined orientation.

14 Claims, 17 Drawing Sheets

ANTENNA ARRAY INSTALLATION

TECHNICAL FIELD

The present disclosure relates to a method of installing an antenna array.

BACKGROUND

The principle of phased array antennas has been known for many decades. Phased array antennas have been used for many applications, including steerable radar, signal broadcasting, satellite communications, wireless HDMI, the wireless networking standard IEEE 802.11ad, and many other uses. One recent development is the use of phased array antennas for cellular communication equipment at millimeter wave frequencies introduced with the New Radio (NR) standard of 3GPP, also known as κG. A typical application is a MiFi router that provides internet access to private homes through a wireless connection with a cellular base station. The connection to the base station comprises phased array antennas at the terminal as well as at the base station.

Phased arrays provide both a high directivity, or gain, and a programmable steer direction. A focused beam of radio waves can be aimed into a range of desired directions by applying a phase offset to the signals transmitted or received at each element in the array.

However, the range of steer directions of the phased array can be relatively restricted, because the array gain reduces at higher scan angles. As one example, the 3GPP requirements for high power fixed wireless access (FWA) equipment specify performance for just 15% of the total spherical coverage (i.e. 15% of solid angle) around the device. The relationship between the spherical coverage of an antenna array and the beam angle is shown in FIG. 1. The fraction of the surface of the spherical area that intersects with a cone with apex angle 2θ (i.e. the area of the spherical cap) is given by $A_{cap}/A_{sphere}=(1-\cos\theta)/2$. A 15% solid angle (as specified in the 3GPP requirements) corresponds to a scan angle θ of up to 45.6°. At a scan angle θ, the effective aperture of the antenna array is reduced by a factor $\cos(\theta)$. In other words, even with optimum phasing and no other losses, the energy density transmitted into (or received from) the array is reduced by a factor $\cos(\theta)$ (Lambert's cosine law). For θ=45.6°, the loss of directivity is at least 1.6 dB. Other implementation losses further reduce the array gain at higher scan angles. A reduced array gain will degrade the link quality between the base station and the terminal. Unless the two are very close, reduced gain will limit the throughput that can be achieved in both uplink and downlink direction resulting in longer data transfer durations.

In addition to the throughput loss at higher scan angles, the frequencies used for 5G communication systems (i.e. between 24 GHz and 48 GHz) easily suffer high losses when passing through most materials, including window panes, tree foliage and even rainfall. Losses are particularly high if the signal path is blocked by walls or other solid structures.

Connection quality between a user device and a base station is often assessed by measuring the total observed incoming power. In mobile communications, this is often referred to as RSSI (received signal strength indicator). Most mobile devices display an indicator of signal strength to the user. With phased arrays, however, the received signal power depends on the location and orientation of the array (owing to the losses at higher scan angles as described above).

When equipment is installed for industrial or professional use, directive antennas for signal strength measurements and knowledge of nearby base stations may be available, so that optimal device location and orientation can be identified. However, for other users, such guidance is often unavailable. Therefore, installation of phased array equipment often involves a trial-and-error based setup (similar to attempting to point a domestic TV aerial in the right direction), and the optimum placement and orientation is often difficult to determine. This means that these users can experience poor throughput performance.

Accordingly, there exists a need to minimize throughput loss in phased array systems.

SUMMARY

This summary introduces concepts that are described in more detail in the detailed description. It should not be used to identify essential features of the claimed subject matter, nor to limit the scope of the claimed subject matter.

According to one aspect of the present disclosure, there is provided a method as defined in claim 1. According to another aspect of the present disclosure, there is provided a non-transitory computer-readable medium as defined in claim 14. According to a further aspect of the present disclosure, there is provided a phased array antenna.

Set out below are a series of numbered clauses that disclose features of further aspects, which may be claimed. The clauses that refer to one or more preceding clauses contain optional features.

1. A method for installation of a phased array antenna receiving a signal, the method comprising:
   determining that a higher directivity of the phased array antenna is achievable;
   determining an orientation of the phased array antenna at which the higher directivity is achievable; and
   providing instructions for adjusting the orientation of the phased array antenna from an initial orientation to the determined orientation.
2. A method according to clause 1, wherein determining that a higher directivity of the phased array antenna comprises:
   determining that the signal is received via a grating lobe of the phased array antenna.
3. A method according to clause 1 or clause 2, wherein the orientation of the phased array antenna at which the higher directivity is achievable is an orientation at which the signal is received via a main lobe of the phased array antenna.
4. A method according to clause 2, wherein determining that the signal is received via a grating lobe of the phased array antenna comprises:
   receiving the signal at the phased array antenna, wherein the phased array antenna comprises a plurality of antenna elements, and wherein a first spacing between a first antenna element and a second antenna element adjacent to the first antenna element in a first direction is different to a second spacing between the second antenna element and a third antenna element adjacent to the second antenna element in the first direction.
5. A method according to clause 4, wherein a third spacing between the first antenna element and a fourth antenna element adjacent to the first antenna element in a second direction is different to a fourth spacing between the fourth antenna element and a fifth antenna element adjacent to the fourth antenna element in the second direction, wherein the second direction is non-parallel to the first direction.
6. A method according to clause 5, wherein the first direction is orthogonal to the second direction.
7. A method according to any of clauses 4 to 6, wherein the plurality of antenna elements comprises:
   a first plurality of antenna elements displaced in the first direction by a positive displacement from a hypothetical uniform array of equally spaced elements; and
   a second plurality of antenna elements displaced in the first direction by a negative displacement from the hypothetical uniform array;
   wherein the number of elements in the first plurality of elements is equal to the number of elements in the second plurality of elements.
8. A method according to any of clauses 4 to 7, wherein the first spacing is about 50 percent greater than the second spacing.
9. A method according to any of clauses 4 to 8, wherein the first antenna element is displaced in the first direction from a hypothetical uniform array of equally spaced elements, wherein the displacement of the first antenna element in the first direction is about 10 percent of the spacing between the elements of the hypothetical uniform array.
10. A method according to any of clauses 4 to 9, wherein determining that the signal is received via a grating lobe of the phased array antenna comprises:
   measuring the received power of the signal, wherein the signal is detected by applying a first set of phase offsets corresponding to a main lobe of the phased array antenna;
   measuring the received power of the signal received by applying a second set of phase offsets corresponding to a grating lobe of the phased array antenna; and
   determining that the signal is received via the grating lobe if the received power of the signal is higher when the second set of phase offsets is applied.
11. A method according to any of clauses 1 to 10, wherein the phased array antenna is included in a device comprising a plurality of LEDs, and wherein providing instructions for adjusting the orientation of the phased array antenna comprises illuminating at least one of the plurality of LEDs.
12. A method according to any of clauses 1 to 11, wherein the phased array antenna is included in a device, the device in communication with an external device comprising a user interface, and wherein providing instructions for adjusting the orientation of the phased array antenna comprises providing instructions via the user interface of the external device.
13. A method according to clause 12, wherein the external device is a smartphone.
14. A method according to clause 2, wherein determining that the signal is received via a grating lobe of the phased array antenna comprises:
   determining a first phase offset that maximizes the received power of a first signal having a first frequency; and
   determining a second phase offset that maximizes the received power of a second signal having a second frequency greater than the first frequency;
   determining the difference between the second phase offset and the first phase offset; and
   determining that the sign of the difference between the second phase offset and the first phase offset is not equal to the sign of the first phase offset or the sign of the second phase offset.
15. A method according to any of clauses 1 to 14, wherein determining that a higher directivity of the phased array antenna is achievable comprises:
   determining that the signal is a reflected signal; and
   determining that the phased array antenna can be reoriented to receive a non-reflected signal.
16. A method according to clause 15, wherein determining that the signal is a reflected signal comprises determining that a higher directivity is achievable at the phased array antenna by optimizing the received power of a candidate signal path and the received signal quality (RSQ) of the candidate signal path.
17. A method according to any of clauses 1 to 16, wherein the signal is a first signal received from a first base station at a first angle of arrival, and wherein determining that a higher directivity of the phased array antenna is achievable comprises:
   receiving a second signal from a second base station at a second angle of arrival;
   determining a normalized signal power of the first signal to account for the first angle of arrival;
   determining a normalized signal power of the second signal to account for the second angle of arrival; and
   determining that the normalized signal power of the second signal exceeds the normalized signal power of the first signal.
18. A method according to clause 17, wherein determining the normalized signal power of the first signal comprises dividing the received power of the first signal by the antenna gain corresponding to the first angle of arrival.
19. A non-transitory computer-readable medium comprising instructions that, when executed by a processor of a device, cause the device to carry out a method according to any of clauses 1 to 18.
20. A phased array antenna comprising a plurality of antenna elements, wherein a first spacing between a first antenna element and a second antenna element adjacent to the first antenna element in a first direction is different to a second spacing between the second antenna element and a third antenna element adjacent to the second antenna element in the first direction.
21. A phased array antenna according to clause 20, wherein a third spacing between the first antenna element and a fourth antenna element adjacent to the first antenna element in a second direction is different to a fourth spacing between the fourth antenna element and a fifth antenna element adjacent to the fourth antenna element in the second direction, wherein the second direction is nonparallel to the first direction.
22. A phased array antenna according to clause 21, wherein the first direction is orthogonal to the second direction.
23. A phased array antenna according to any of clauses 20 to 22, wherein the plurality of antenna elements comprises:
   a first plurality of antenna elements displaced in the first direction by a positive displacement from a hypothetical uniform array of equally spaced elements; and
   a second plurality of antenna elements displaced in the first direction by a negative displacement from the hypothetical uniform array;

wherein the number of elements in the first plurality of elements is equal to the number of elements in the second plurality of elements.

24. A phased array antenna according to any of clauses 20 to 23, wherein the first spacing is about 50 percent greater than the second spacing.

25. A phased array antenna according to any of clauses 20 to 24, wherein the first antenna element is displaced in the first direction from a hypothetical uniform array of equally spaced elements, wherein the displacement of the first antenna element in the first direction is about 10 percent of the spacing between the elements of the hypothetical uniform array.

BRIEF DESCRIPTION OF FIGURES

Specific embodiments are described below by way of example only and with reference to the accompanying drawings, in which.

DETAILED DESCRIPTION

Figure 1:
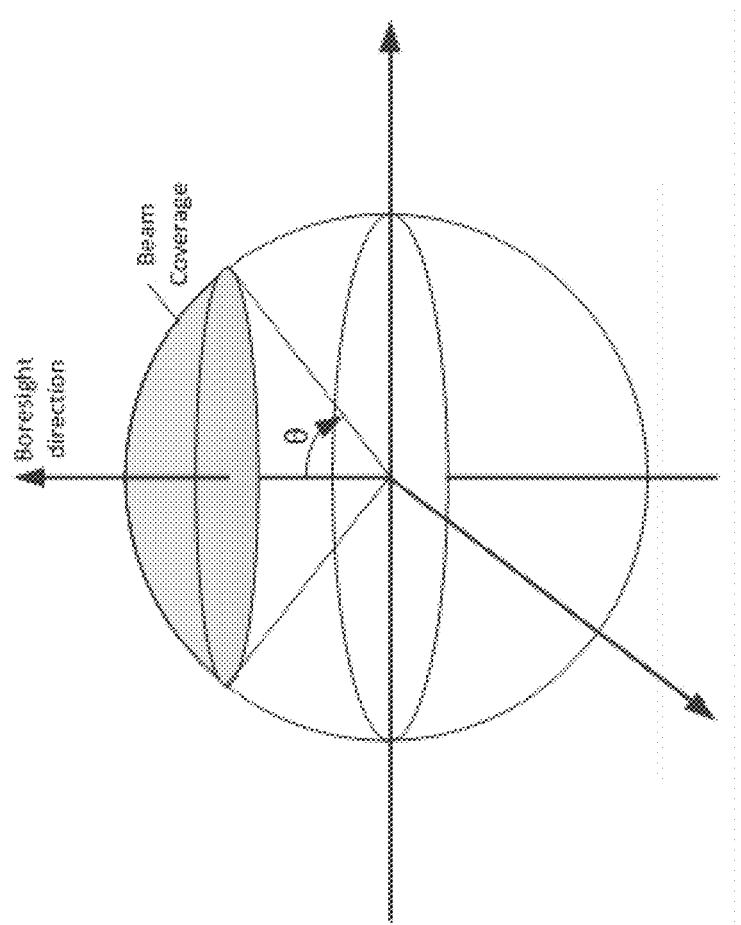
FIG. 1 shows the relationship between beam angle and spherical coverage for an antenna.
Figure 2:
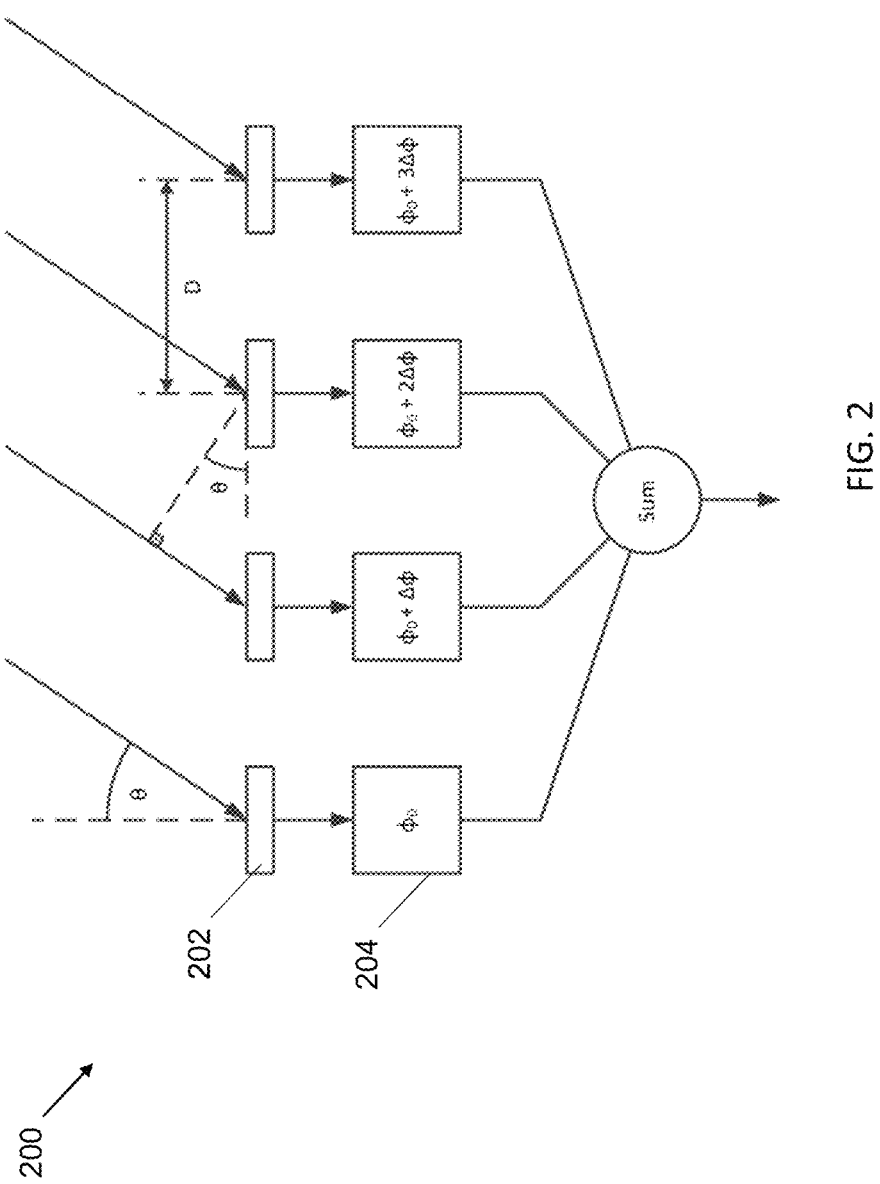
FIG. 2 is a schematic diagram of a one-dimensional phased array antenna.

FIG. 2 shows the principle of operation of a phased array antenna 200 for a one-dimensional phased array. A phased array antenna can be used to obtain an "angle of arrival" measurement for received signal. This allows accurate calculation of an incoming beam angle, a method often used in radar applications. Although this method is described with respect to the one-dimensional array 200 shown in FIG. 2, it is also applicable for a two-dimensional array.

An incoming wave with wavelength $\lambda$ from a distant source meets the antenna 200 at angle $\theta$ from the array normal, and is received by N elements 202 equidistantly spaced at distance D. The signals from adjacent elements 202 are delayed by a constant phase offset $\Delta\varphi$ by N phase shifters 204 (corresponding to the N elements 202). If this phase offset $\Delta\varphi$ matches the delay the wavefront experiences between two elements 202 then the delayed signals from each element 202 coherently add up. If the phase offset $\Delta\varphi$ does not match the external delay difference, then the summation yields a smaller signal.

The phase offset $\Delta\varphi$ that maximizes received signal power is directly related to the angle of arrival of the incoming beam. In particular, coherent signal summation is achieved if:

$$\Delta\varphi = 2\pi \cdot (D/\lambda) \cdot \sin \theta \qquad \text{(Equation 1)}$$

This is referred to herein as the "coherence condition". Most phased arrays use a uniform array pitch (i.e. spacing D) and the phase offset $\Delta\varphi$ between any two neighboring elements follows the rule above. The relationship holds even for arrays with non-uniform element pitch as long as the phase offset $\Delta\varphi$ between two neighboring elements is related to the physical distance between them.

A related method involves inverting the phases of half the antenna elements. In that case, the incoming beam angle corresponds to a minimum power level observed. Both methods are often combined to improve accuracy.

Note that the paths lengths difference $D \cdot \sin \theta$ in Equation 1 creates a time difference between two adjacent paths. On the other hand, commercial phased array implementations create a phase different between two paths (using the I/Q vector modulation technique). For a single-frequency sinewave, time and phase correspond exactly. However, for wideband signals, the two cannot be matched precisely across the whole bandwidth of the signal.

The ratio $D/\lambda$ is a critical design parameter for phased arrays. For an array pitch D up to half the signal wavelength $\lambda$ ($0 < D/\lambda < \frac{1}{2}$), the coherency condition creates a unique mapping between any incoming wave angle $-\pi/2 < \theta < \pi/2$ ($-90° < g < +90°$) and the programmed phase offset, $\Delta\varphi$. However, most practical phased array implementations utilize a pitch D between half and the full wavelength A of the targeted signal ($\frac{1}{2} < D/\lambda < 1$). This is because a wider pitch increases the aperture and thereby the gain of the array, at least near boresight directions. The disadvantage of the wider spacing is only apparent at steeper steer angles that anyway suffer from reduced performance, because for larger scan angles not all of the power is concentrated in a single beam.

When $\frac{1}{2} < D/\lambda < 1$, the coherence condition does not allow an unambiguous mapping between incoming wave angle $\theta$ and programmed delay offset $\Delta\varphi$ across the antenna.

Figure 3:
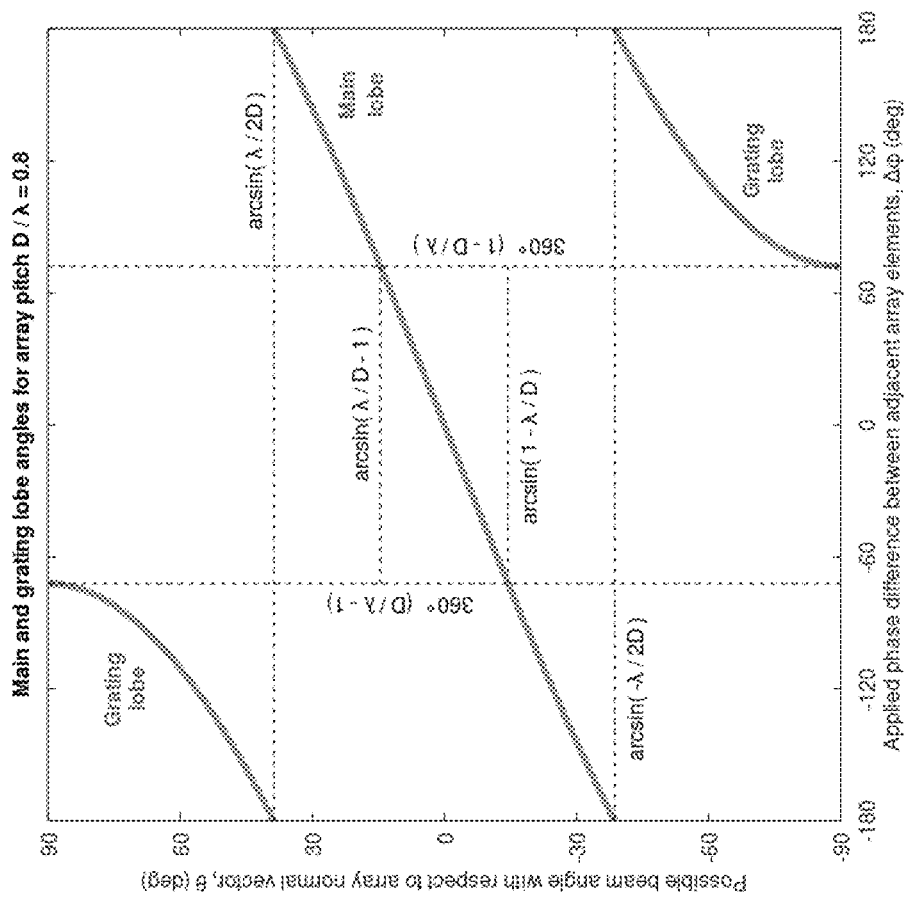
FIG. 3 is a graph of the relationship between phase angle and angles of arrival of a beam.

For most angles, there are two possible directions from which the signal may be originating. For example, when $D/\lambda = 0.8$, incoming signal from $\theta = 60°$ is generally indistinguishable from signal incoming from around $\theta \sim -22.5°$ (corresponding to $\Delta\varphi$ of approximately $-110°$ in FIG. 3). While the signal from a steeper angle will be weaker (because of Lambert's cosine law and other losses), this information is not useful if the absolute signal power arriving at the antenna is unknown. FIG. 3 shows the two possible solutions to the coherency condition for $D/\lambda = 0.8$ with some characteristic angles marked. As shown in FIG. 3, there are two possible angles of arrival for a large range of look directions. Specifically, only angles of arrival between $-14°$ and $+14°$ can be uniquely determined. For angles of arrival outside of this interval, there is no way of determining whether the signal source is received from an angle of 60° or −22.5°. It is unlikely that a user will have positioned a device comprising a phased array antenna such that the angle of arrival of the signal from the base station falls within the limited range of angles that allows for unique identification of the angle of arrival.

When the array is used to transmit a signal, a beam is directed into direction θ using the value of Δφ given by the same array equation as above. However, for a large range of angles, not just one but two beams will be created, the intended one and a second, called the grating lobe. The main beam, at angles up to ±arcsin(λ/2D) as shown in FIG. 3, and the grating lobe (at higher absolute beam angles) are identical images of one another and only differ in power level due to angle-dependent array gain characteristics (e.g. Lambert's cosine law). For arrays of limited size, there will also be a number of other side beams (called sidelobes) but these have significantly lower power density and their location is known from the array geometry.

Figure 4:
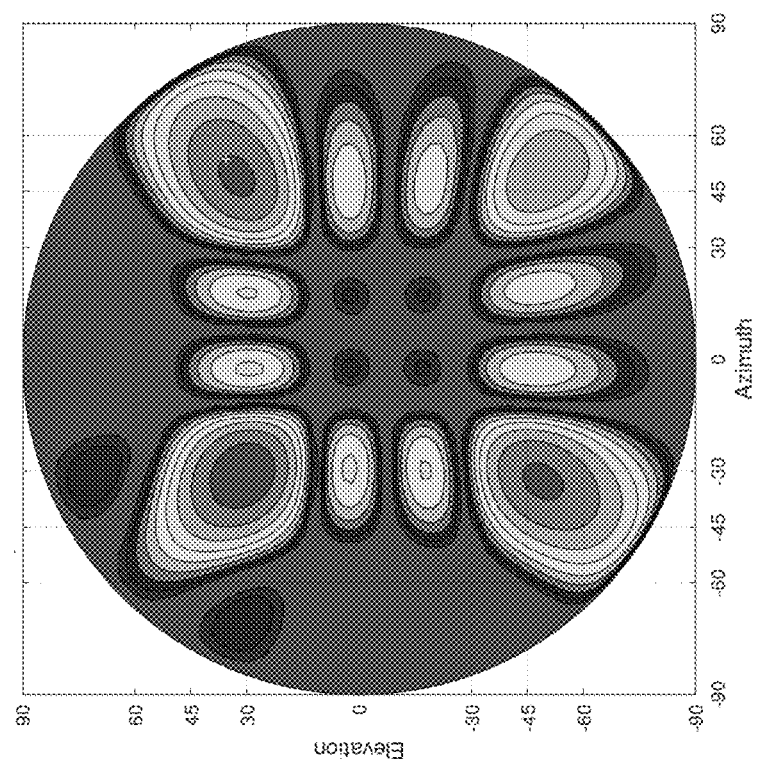
FIG. 4 shows the locations of a main lobe and grating lobes for a two-dimensional antenna array.

In the two-dimensional case, up to three grating lobes generally appear that are indistinguishable from the mean beam. In the example shown in FIG. 4, the beam is steered into the direction of the cross. The array will then be sensitive to beams incoming from this direction, as well as three other points in the sky (visible as corners of a square in FIG. 4). If the beam was deliberately steered into any of these directions, the array directivity plot would look essentially the same (with any differences only due to small design tolerances).

Without unambiguous angle-of-arrival measurements for most practical array designs, there is no way to assist a user with setting up the device with the best possible orientation (which is with the incoming signal direction close to the array normal vector). If the system cannot discriminate whether an incoming signal is received via a stronger main beam or a weaker grating lobe, it is also impossible to estimate the true antenna power level. Furthermore, if signals from different stations are received at different angles and these angles are ambiguous, it is not easily possible to select the strongest station (or report the correct signal strength to the network for the network to make the most appropriate selection). The present disclosure addresses these issues by providing instructions to the user to allow them to reorient the antenna array of their device so that it receives the strongest signal at an angle close to the array normal vector, thereby improving throughput.

Figure 6:
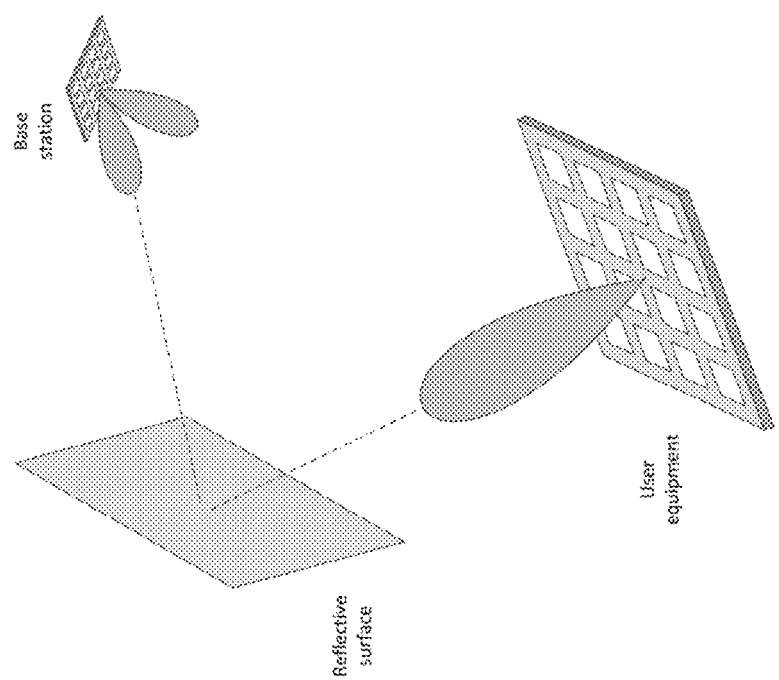
FIG. 6 shows a second environment in which a phased array antenna receives a suboptimal signal.
Figure 7:
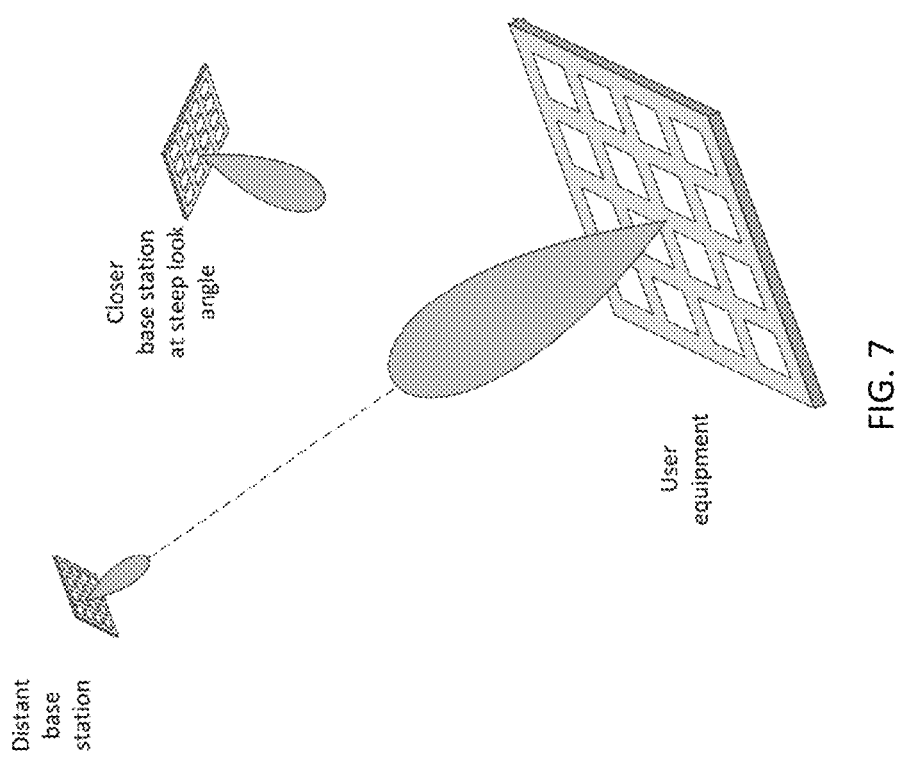
FIG. 7 shows a third environment in which a phased array antenna receives a suboptimal signal.

There are three main scenarios in which a local optimum may be identified during installation of a phased array antenna. These scenarios are shown in FIGS. 5 to 7.

Figure 5:
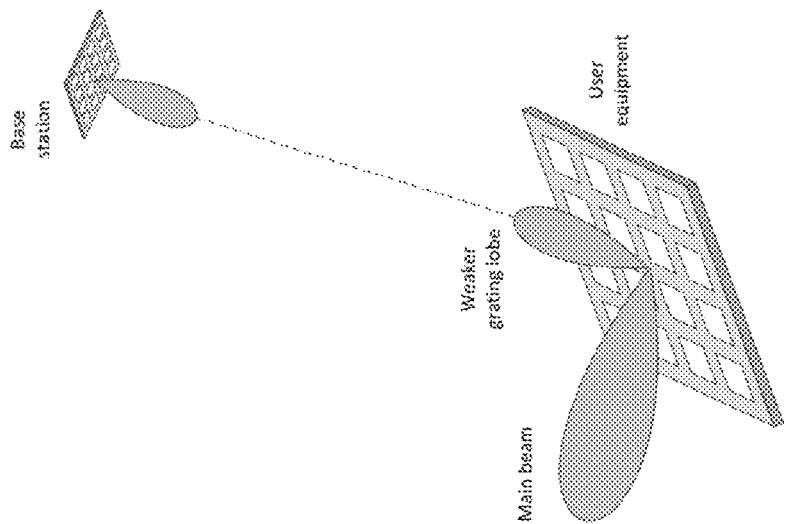
FIG. 5 shows a first environment in which a phased array antenna receives a suboptimal signal.

FIG. 5 shows a first environment in which a device comprising a phased array antenna receives a signal from a base station. In the environment shown in FIG. 5, a user has positioned the device such that the antenna has a particular orientation with respect to the base station. For example, the user may have positioned the device on a window sill, with the antenna facing a window pane. The user has no knowledge of the location of the base station.

After the user has positioned the device, the device sweeps the phase offset Δφ of the antenna from −180° to 180°, in order to determine an optimal phase offset Δφ. The optimal phase offset Δφ is the phase offset that maximizes the power of the received signal (i.e. by achieving coherent signal summation).

However, as shown in FIG. 5, the signal from the base station is received through the weaker grating lobe, rather than via the stronger main lobe. This is a result of the initial orientation of the antenna by the user.

FIG. 6 shows a second environment in which a signal from a base station is reflected. In the environment shown in FIG. 6, there are at least two unknowns. Firstly, as with the environment shown in FIG. 5, the user does not know whether the signal from the base station is received via the stronger main lobe or via the weaker grating lobe. Secondly, the device may determine a phase offset Δφ that aligns with the lower power density reflected signal, while missing the higher power, direct line-of-sight signal from the base station. In particular, this may occur when the direct line-of-sight signal meets the antenna array at a high scan angle. As noted above, this would result in attenuation of the direct line-of-sight signal by an angle dependent factor. If the power of the attenuated direct line-of-sight signal is less than the power of the reflected signal (based on the initial orientation of the antenna), then the device will determine a phase offset Δφ that results in receiving the reflected signal. This results in sub-optimal performance, because the reflected signals often suppress one of the polarization directions of the signal, which reduces the capacity for multiple-input multiple-output (MIMO) operation.

FIG. 7 shows a third environment in which signals from two base stations (a closer base station and a distant base station) are received. Again, there are at least two unknowns in this environment. Firstly, as with the environments in FIGS. 5 and 6, the user does not know whether the signals received from each base station are received via the main lobe or via a grating lobe. Secondly, the device may determine a phase offset Δφ that aligns with a lower power signal from the distant base station, while missing the higher power signal from the closer base station. As with the environment in FIG. 6, this may occur when the signal from the closer base station meets the antenna array at a high scan angle. As noted above, this would result in attenuation of the signal from the closer base station by an angle dependent factor. If the power of the attenuated signal from the closer base station is less than the power of the signal from the distant base station (based on the initial orientation), then the device will determine a phase offset Δφ that results in receiving the lower power signal from the distant base station, resulting in sub-optimal performance for the user.

Figure 8:
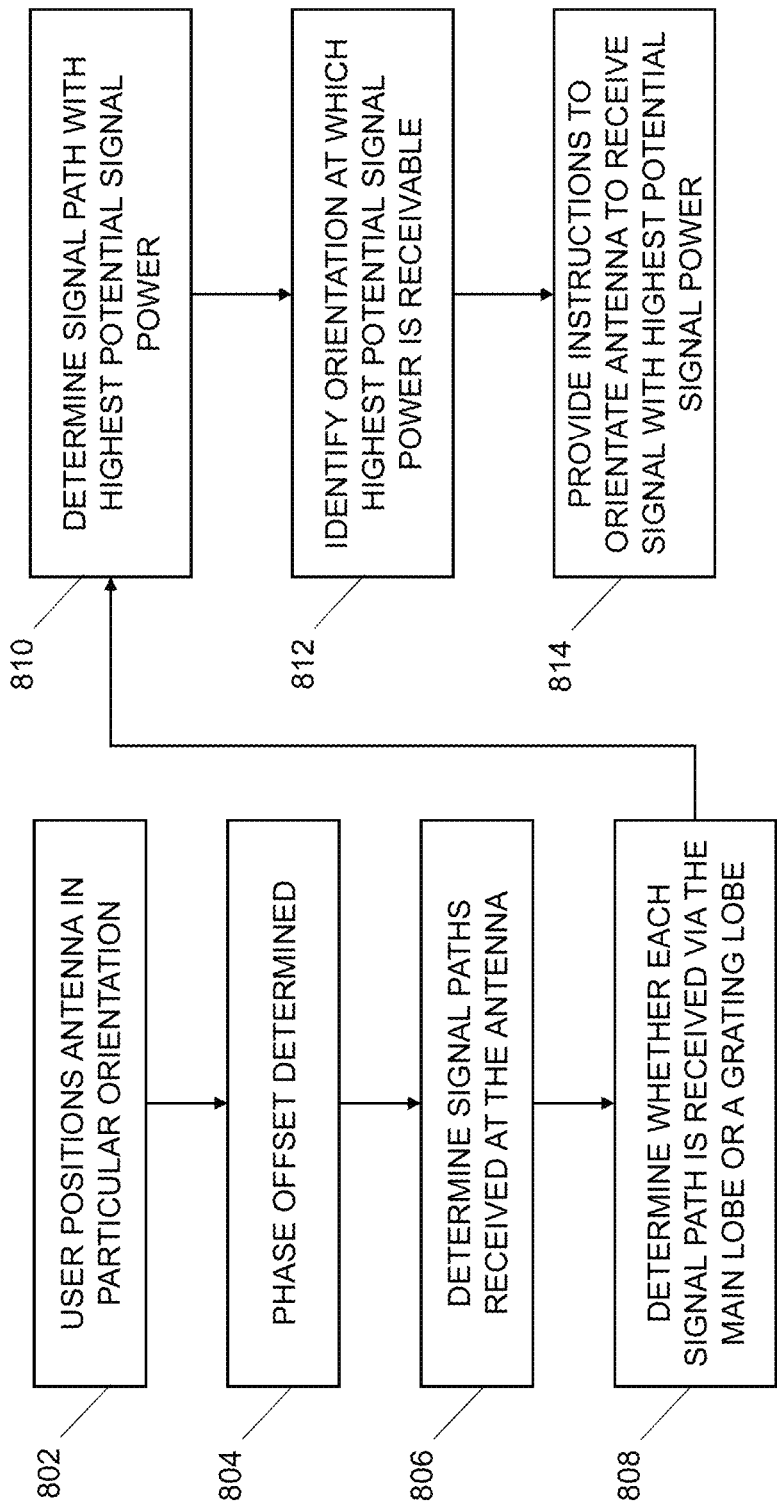
FIG. 8 shows a flowchart of a method for installation of a phased array antenna.

FIG. 8 is a method for installation of a phased array antenna. The method of FIG. 8 is used to determine whether an antenna can be reoriented so that the directivity (or gain) of the antenna is increased (thereby also increasing the efficiency of the antenna). Optionally, at 802, a user positions the antenna in a particular orientation. Optionally, at 804, a phase offset Δφ is determined that maximizes the power of the signal received (e.g. from a base station). For example, the phase offset Δφ may be determined by sweeping from a phase offset Δφ of −180° to a phase offset Δφ of +180°.

Alternatively, the method may commence at 806 following an earlier determination of a phase offset Δφ after the user has positioned the antenna.

At 806, a number of candidate signal paths received at the antenna is determined. For example, the determination may comprise sweeping the phase offset Δφ from −180° to +180°. Each candidate signal path may be associated with a candidate phase offset Δφ identified when sweeping the phase offset. For example, signal paths may be associated with N (e.g. three, five, etc.) local maxima identified when sweeping the phase offset. For each detected signal, determining the number of candidate signal paths may include decoding the physical cell identification number (PCI) transmitted in the primary and secondary synchronization signals (PSS and SSS). If more than one PCI is identified, then signals are received from multiple base stations. If the same PCI is received twice, then a reflected signal may be identified by poor de-correlation between the two MIMO layers because one of the polarization directions is attenuated more by the reflection than the other. This can be estimated from the reference symbols received.

At 808, it is determined whether each candidate signal path is received via the main lobe of the antenna or via a grating lobe of the antenna. Determining whether a candidate signal path is received via the main lobe of the antenna or via a grating lobe may comprise determining the true angle of arrival of the candidate signal path at the antenna.

At 810, it is determined for each candidate signal path whether receiving the signal path via the main lobe of the antenna would result in the highest potential antenna directivity. For example, the power of a candidate signal path at the true angle of arrival is measured and subsequently normalized to the expected power that would be achieved if the antenna array were oriented such that the candidate signal path is received at an angle of arrival close to the array normal (i.e. a low value of ay Normalization of the candidate signal path may be achieved by dividing the power of the candidate signal path at the true angle of arrival by an angle-dependent function such as the cosine of the true angle of arrival, or a similar function of the true angle of arrival that describes the array response (e.g. takes into account higher losses at steep angles). Optionally, at 812, the candidate signal path that provides the highest potential directivity is selected (if more than one signal path is received at the antenna). Continuing the above example, selecting the candidate signal path that provides the highest potential directivity may comprise comparing normalized signal powers of all signal paths, and selecting the candidate signal path with the highest normalized signal power.

Optionally, in order to account for reflected signals, the determination at 810 also factors in the received signal quality (RSQ). A reflected signal may have high power, but poor signal quality. Therefore, the determination of the highest potential directivity at 810 may seek to optimize both the received power of the signal and the received signal quality. In most cases, a reflected signal will have lower power anyway, as a result of a 3 dB loss resulting from the loss of information in one of the polarization directions. Given that a reflected signal will usually have lower power, a determination based additionally on signal quality may alternatively be omitted.

At 814, an orientation of the phased array antenna at which the highest potential directivity is achievable is identified. The orientation at which the highest potential directivity is achievable may be an orientation at which the angle of arrival of the candidate signal path that provides the highest potential directivity is approximately normal to the antenna array.

At 816, a user of the phased array antenna is provided with instructions to orientate the antenna so that it receives the signal that provides the highest potential antenna directivity. For example, the user may be provided with instructions to adjust the orientation of the antenna from its initial orientation (e.g. as positioned at 802) to the orientation determined at 814. As one example, the instructions provided to the user may be in the form of LEDs that indicate the angle of arrival of the signal that provides the highest potential directivity. Once the array is oriented so that the angle of arrival of the signal that provides the highest potential directivity is approximately normal to the antenna array, the phase offset $\Delta\varphi$ can be fine-tuned to maximize the received power of the selected signal. As another example, the instructions provided to the user may be in the form of graphically displayed reorientation instructions provided to an application running on a separate user device that is connected to the device comprising the phased array antenna via Bluetooth or a similar data interface.

Figure 9:
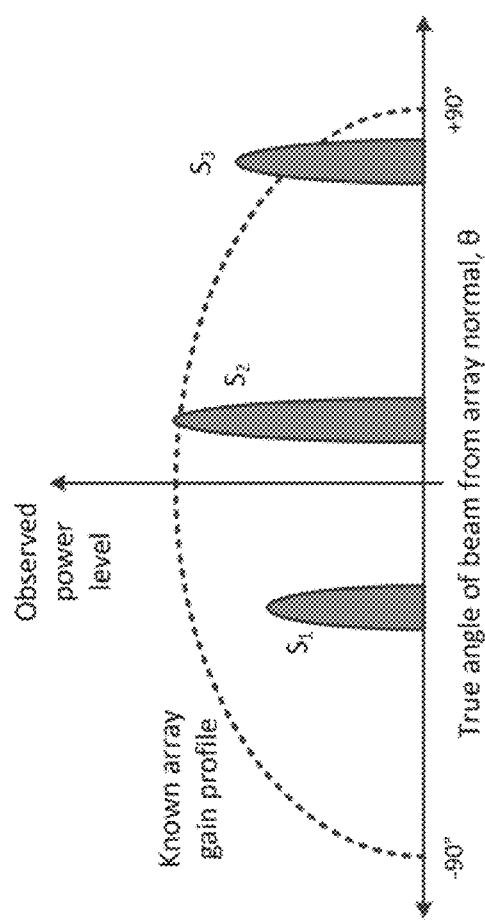
FIG. 9 shows received signals observed when scanning the phased array antenna.

FIG. 9 shows the true angles of arrival of signal paths that are determined at 808. As shown in FIG. 9, three signal paths are observed (S1, S2 and S3). Signal S2 has the highest strength in absolute terms. However, it can be seen that normalization of the signals (e.g. at 810 in FIG. 8) with respect to the array's known gain response (as indicated by the dashed line in FIG. 9) would yield a higher result for S3 than for S2. Consequently, S3 is the signal with the highest potential received power once the antenna array is suitably reoriented to the true angle of arrival of signal path S3. Therefore, the user should be guided to swing the antenna suitably to bring S3 closer to the antenna's boresight direction.

The guidance to the user to reorient the antenna array can be provided in a number of forms. For example, the guidance may take the form of a "virtual compass", where a needle points towards the signal source identified as having the highest potential received power. Alternatively, the guidance may be provided via an application on a user's mobile device. Another example is a series of LEDs in a circular pattern, with an additional LED at the center of the circle. The LED aligned with the direction of the most promising signal is initially lit up. Then, as the user turns the unit, different LEDs in the circle light up in turn, in accordance with the current orientation of the unit. Once the unit is oriented in line with the LED indicating the most promising signal, the LED at the center of the circle lights up to indicate that the unit is optimally oriented.

Figure 10C:
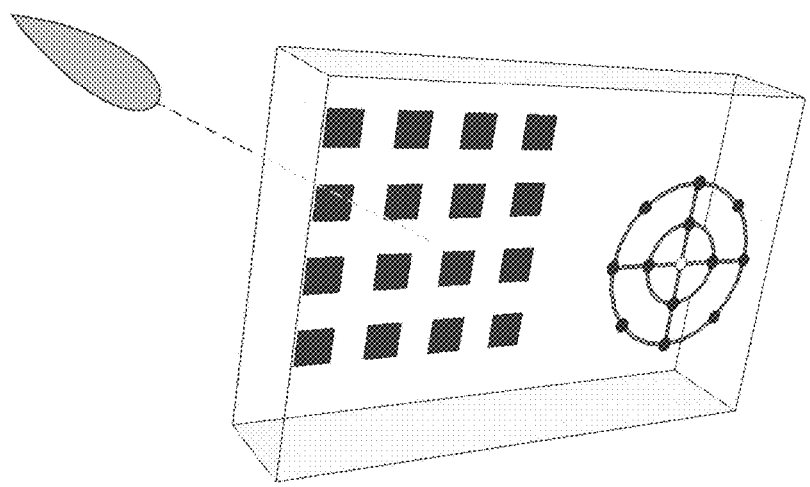
FIGS. 10A to 10C are schematic diagrams of instructions provided to the user for reorientation of the phased array antenna.
Figure 10B:
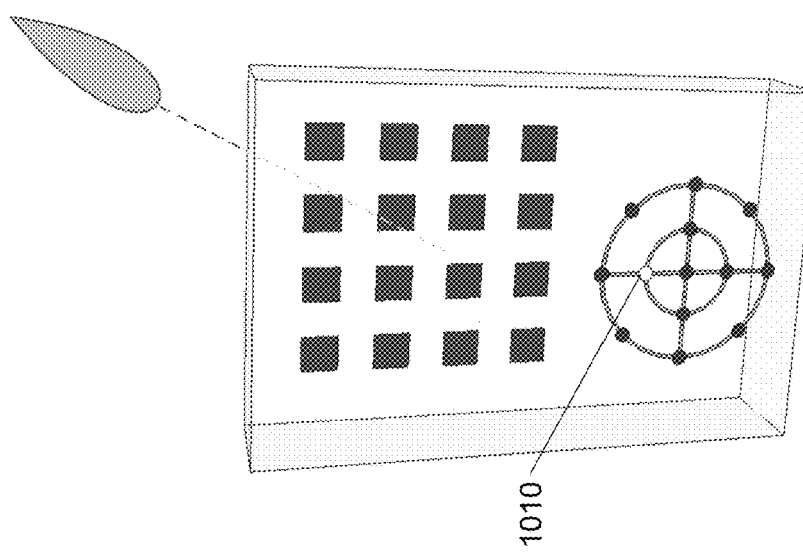
Figure 10A:
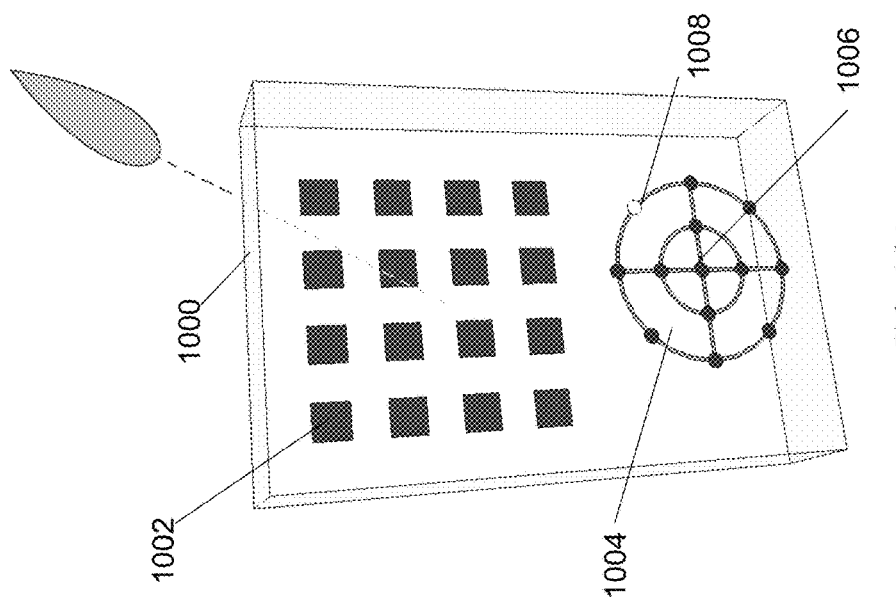

An example of the guidance provided to the user at 812 in FIG. 8 is shown in FIGS. 10A to 10C. As shown in FIG. 10A, a signal is received at a phased array 1002 of a transceiver 1000. The transceiver 1000 may be, for example, a mmWave transceiver installed on a window sill. In this example, the elements of the antenna array 1002 are facing the window. The transceiver 1000 also includes an LED display 1004 on an opposite face of the transceiver 1000 to the antenna array 1002. In the example where the antenna elements face a window, the LED display 1004 faces an interior of a room, so that it is visible to the installer.

As shown in FIGS. 10A to 10O, the LED display 1004 includes a plurality of LEDs arranged in a pattern of concentric circles, with a central LED 1006. In the orientation shown in FIG. 10A, a first LED 1008 is illuminated. The first LED 1008 is situated in the upper right quadrant of the LED display 1004, indicating that the user should rotate the transceiver clockwise about its length-wise axis and tilt the transceiver backward about its base.

FIG. 10B shows the transceiver 1000 including the LED display 1004 once the user has rotated the transceiver clockwise about its length-wise axis. As shown in FIG. 10B, a second LED 1010 is now illuminated. The second LED 1010 indicates that the transceiver 1000 is optimally oriented about one axis (i.e. its longitudinal axis) but not the other (i.e. its lateral axis).

FIG. 10O shows the transceiver 1000 including the LED display 1004 once the user has tilted the transceiver backward about its base. This action optimally aligns the antenna array 1002 so that it is normal to the most promising signal. As shown in FIG. 10O, the central LED 1006 is illuminated to indicate that the antenna array 1002 is optimally oriented.

There are two distinct ways of discriminating between signals received via the main lobe (i.e. at lower steer angles, as shown in FIG. 3) and signals received via a grating lobe (i.e. at higher steer angles, as shown in FIG. 3). Each of these methods will now be described.

First Method—Modified Array Geometry

A first method involves measuring the gain of received signals using an antenna array with non-uniform element spacing. An example of an antenna array with non-uniform spacing is shown in FIG. 11A.

Figure 11A:
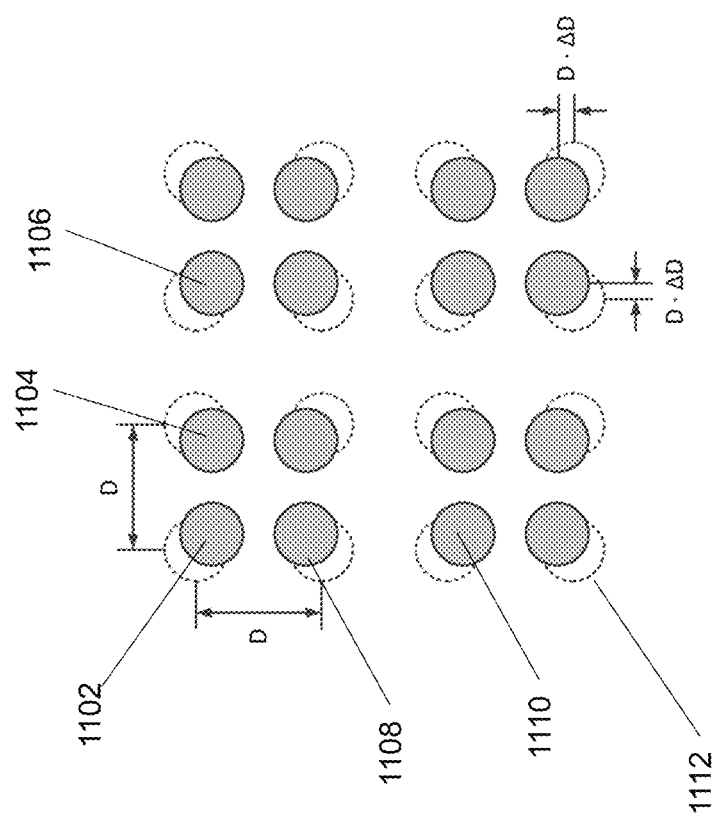
FIG. 11A shows an antenna array in which antenna elements are displaced from their usual locations.

As shown in FIG. 11A, the elements of the array are displaced from a uniform grid. This results in the antenna array having two pitch values (along each of two orthogonal directions in a two-dimensional array), rather than the single element spacing (or pitch) characteristic of a uniform grid. As shown in FIG. 11A, in the horizontal direction, the pitch between a first element 1102 and a second element 1104 adjacent to the first element 1102 is smaller than the pitch between the second element 1104 and a third element 1106 adjacent to the second element 1104. (Likewise, the pitch between the second element 1104 and the third element 1106 is larger than the pitch between the third element 1106 and the next element adjacent to the third element 1106 in the horizontal direction).

In the example shown in FIG. 11A, the displacement of the elements is consistent in the horizontal and vertical directions. This means that in the vertical direction, the pitch between the first element 1102 and a fourth element 1108 adjacent to the first element 1102 is smaller than the pitch between the fourth element 1108 and a fifth element 1110 adjacent to the fourth element 1108. (Likewise, the pitch between the fourth element 1108 and the fifth element 1110 is larger than the pitch between the fifth element 1110 and the next element adjacent to the fifth element 1110 in the vertical direction).

The arrangement shown in FIG. 11A can therefore be summarized as having two different element pitch values. In other words, for each interior element of the array (i.e. elements not located at the edges of the array), the pitch between the interior element and an element adjacent to the interior element in a first direction is different to the pitch between the interior element and an element adjacent to the interior element in a second direction opposite to the first direction.

In the example shown in FIG. 11A, elements are displaced from a hypothetical uniform grid 1112 with element spacing D by a displacement ΔD in the horizontal direction. In addition, elements are displaced by the same displacement ΔD in the vertical direction. Adjacent elements in the array are displaced from the uniform grid in opposing orthogonal directions. That is, the first 1102 and third 1106 elements are displaced to the right (i.e. with a positive horizontal displacement) whereas the second element 1104 is displaced to the left (a negative horizontal displacement). Likewise, the first 1102 and fifth 1110 elements are displaced downwards (i.e. a negative vertical displacement), while the fourth element 1108 is displaced upwards (a positive vertical displacement).

By moving the antenna elements away from their positions on a uniform grid 1112 with spacing D, the contributions of the elements to the radiation pattern can still be made to add up in phase in the desired main lobe direction (by choosing phase offsets Δφ that ensure this), but now element contributions no longer add up perfectly in phase in the direction of the grating lobes, so the amplitudes of the grating lobes are reduced.

Assume an array with two different pitch sizes D·(1−2 ΔD) and D·(1+2 ΔD). An example configuration is shown in FIG. 11A. Two different phase offsets must be programmed to achieve coherency for the look angle θ:

$\Delta\varphi_{-\Delta D} = 2\pi \cdot D \cdot (1-2\ \Delta D)/\lambda \cdot \sin\theta$ and $\Delta\varphi_{+\Delta D} = 2\pi \cdot D \cdot (1+2\ \Delta D)/\lambda \cdot \sin\theta$.

Figure 11B:
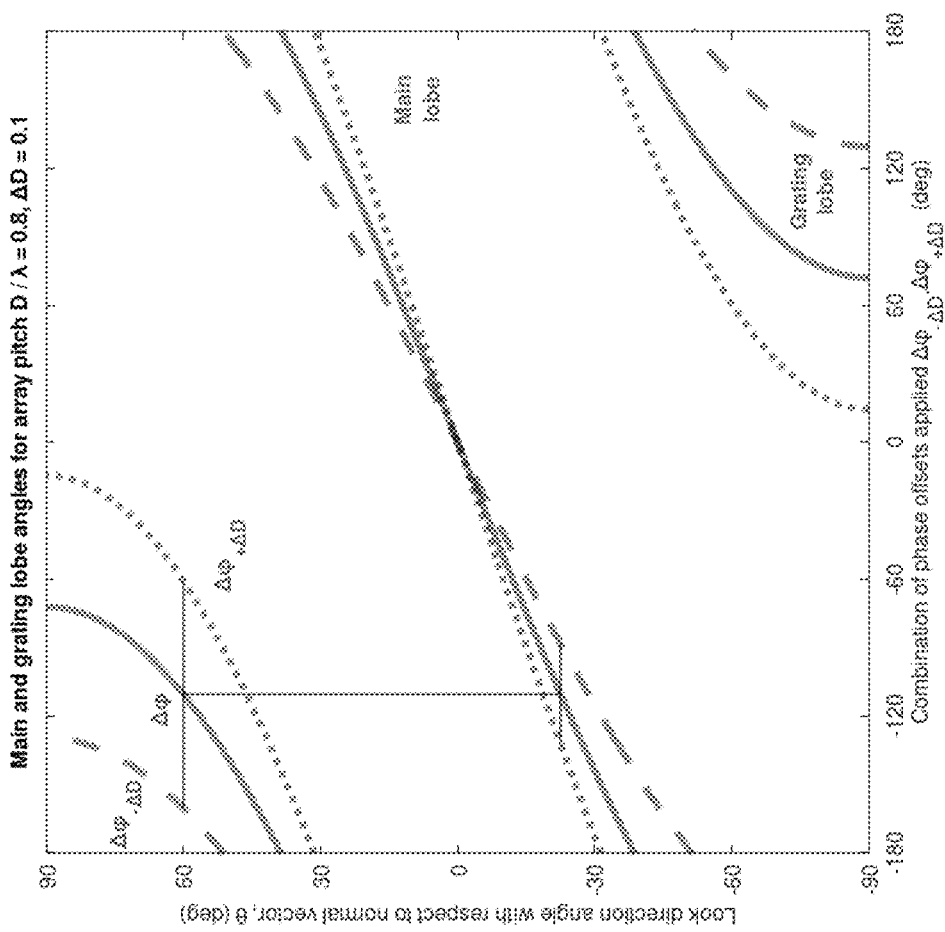
FIG. 11B is a graph of the relationship between phase angle and angles of arrival of a beam for the antenna array of FIG. 11A.

FIG. 11B shows the relationship between these phase offsets and resulting beam angle. For each look direction θ, there is now a uniquely pair of phase offsets $\Delta_{\varphi-\Delta D}$ and $\Delta_{\varphi+\Delta D}$. When the beam is steered to −22.5°, the phase differences applied to the elements are now different compared to the phase differences applied to steer the beam to 60°. As shown in FIG. 11B, the difference between the phase offsets applied to steer the beam to −22.5° is less than the difference between the phase offsets applied to steer the beam to 60°. FIG. 11B also shows the relationship between programmed phase offsets Δφ and steer angle for a regular array (same as FIG. 3).

For small ΔD the array gain response is still similar to the uniform array. In particular, the gain of the main lobe is unchanged. However, signals arriving from the direction previously corresponding to the grating lobe direction no longer perfectly add up coherently. The array gain for signals to or from this direction is therefore reduced. The introduction of the pitch offset parameter ΔD breaks the symmetry between main and grating lobes.

The following process can then be applied, in order to discriminate between a signal received via the main lobe, and a signal received via a grating lobe.

Firstly, the full hemisphere is scanned (by applying appropriate phase offsets Δφ). Then, the signal power level is measured for each direction in which a signal is detected. For each direction, grating lobe directions are looked up from a stored table of performance (or calculated). Phase weights are then applied to look in the grating lobe directions, and the signal power level is measured.

If the signal power level is larger when the phase weights are deliberately set to a grating lobe direction, then the true angle of arrival corresponds to the grating lobe.

This is because the array gain for signals received via the main lobe is now reduced (as a result of the broken symmetry). Therefore, if the true angle of arrival was via the main lobe (e.g.)−22.5°, then the signal would have initially been stronger, and would have been attenuated when the phase weights were set to the grating lobe direction.

However, if the signal power level is smaller when the phase weights are deliberately set to a grating lobe direction, then the true angle of arrival corresponds to the main lobe. This is because the array gain for signals received via the grating lobe is now increased (as a result of the broken symmetry). Therefore, if the true angle of arrival was via the grating lobe (e.g. +60°), then the signal would initially have been attenuated, and the true signal strength would have been received when the phase weights were set to the grating lobe direction.

As noted above, FIG. 11A shows one example where an original square grid with pitch D is modified such that a small offset D·ΔD is added and subtracted alternately as depicted in FIG. 11A. The parameter ΔD can be understood as a relative displacement from the classical square grid. In one example, ΔD is about 0.1, preferably exactly 0.1. In the example shown in FIG. 11A (where ΔD=0.1), the spacing between the second and third elements in the first direction is 50% greater than the spacing between the first and second elements in the first direction. As explained further below, only relatively small displacements, |ΔD|<0.2, achieve the desired effect, so there is no risk of element patches overlapping.

The effect of the array perturbation can be assessed by the following process, which illustrates the choice of ΔD=0.1 as the optimal value:
A. Implement an array with a defined grid spacing D and perturbation ΔD.
B. Calculate phase weights (phase offsets $\Delta\varphi_{-\Delta D}$ and $\Delta\varphi_{+\Delta D}$) to form a beam into a target direction (i.e. to maximize the power of a received signal).
C. Calculate the array radiation pattern for the phase weights calculated at B over all directions, and determine the directivity (gain).
D. Record the difference in directivity of the main beam and the largest observed grating lobe.
E. Repeat B to D to target beams in all directions in a hemisphere (i.e. all potential signal paths such as reflected signals and signals from different base stations).
F. Repeat A to E for values of ΔD ranging from −0.3 to +0.3, recording the lowest difference in directivity between the main beam and grating lobe for each ΔD.

Figure 12:
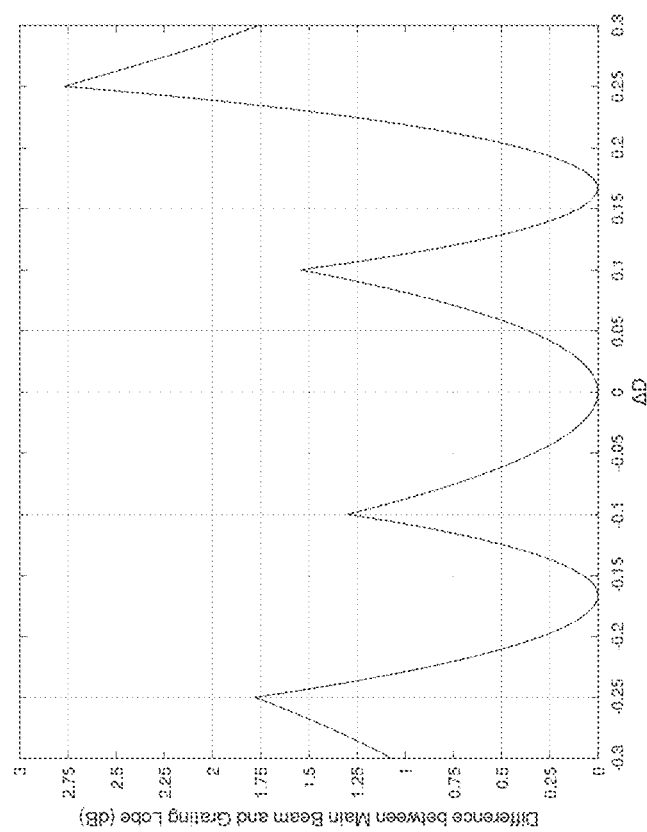
FIG. 12 is a graph of the relationship between the displacement of antenna elements and the power difference between the main lobe and largest grating lobe.

The result of the above analysis is shown in FIG. 12 for an inter-element spacing D=0.8λ. When ΔD=0 (i.e. the elements are aligned to a uniform grid), grating lobes form that have exactly the same directivity as the main beam. This means that it is not possible to discriminate between the main beam and the grating lobe to determine the true angle of arrival. As shown in FIG. 12, the difference between the main beam and the grating lobe increases as the size of ΔD increases, up to a maxima at ΔD=±0.1. Further maxima appear at ΔD=±0.25, but if the elements are shifted this far from their uniform grid positions, they are likely to partially overlap.

The peak in difference between main beam and grating lobe directivity is observed at ΔD=±0.1 for all values of D<λ.

Figure 13:
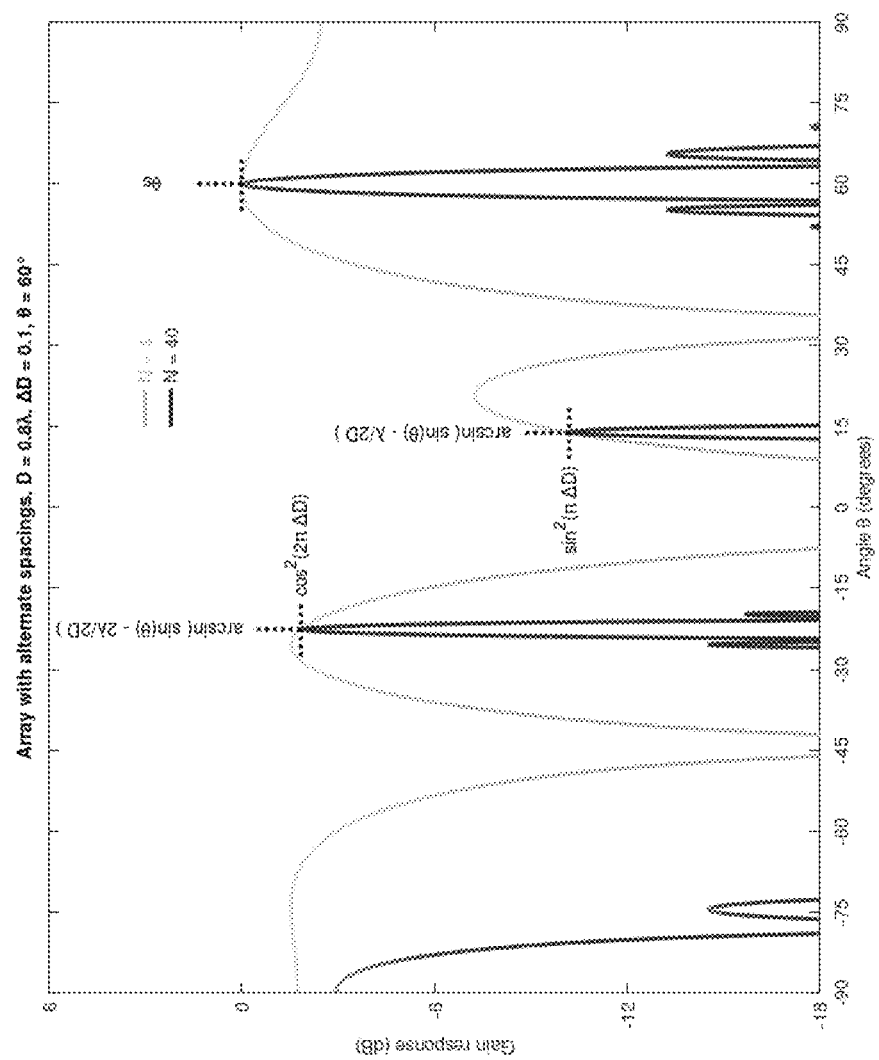
FIG. 13 is a graph of gain response against scan angle for small and large arrays.

The irregular spacing architecture illustrated schematically in FIG. 11A can be solved analytically for large arrays, where there is essentially no difference between positive and negative values of ΔD. The results of this analysis are shown in FIG. 13. FIG. 13 is a one-dimensional of a small (N=4) and large (N=40) array, with analytical limits for very large arrays (N→∞) indicated by the dotted lines in FIG. 13, which appear very close to the beams for the N=40 array. When a beam is steered to angle θ, a grating lobe appears at arcsin(sin(θ)·(2λ/2D)), and this grating lobe has power of $\cos^2(2\pi\Delta D)$ times the power of the main lobe. For larger steer angles and large element spacings, additional grating lobes may appear (not shown). For example, a secondary grating lobe appears at arcsin(sin(θs)·(3λ/2D)) with a relative power of $\sin^2(3\pi\Delta D)$.

If ΔD=0, for a uniform grid, the first grating lobe power is $\cos^2(0)=1$, so this grating lobe is the same intensity as the main beam. The secondary grating lobe amplitude is zero. As ΔD is increased, the first grating lobe amplitude decreases, so the main beam and grating lobe can be distinguished. However as this happens, the secondary grating lobe amplitude increases. The value of ΔD at which there is maximum difference between the main beam and the largest grating lobe occurs when the size of the two grating lobes are identical and this happens when ΔD=⅒, exactly.

At this value of ΔD, $\sin(3/10\pi)=\cos(2/10\pi)=(1+\sqrt{5})/4$, which happens to be exactly half of the Golden Ratio.

For a large array, the best case power ratio between main beam and the largest grating lobe is 20·log 10((1+√5)/4)=−1.84 dB. For a smaller array, the difference will be very slightly smaller (1.5 dB for a square 16 element array), and the grating lobes may not exactly sit at the ideal locations, but ΔD=0.1 is still the configuration with the greatest difference between main beam and the largest grating lobe.

Figure 14:
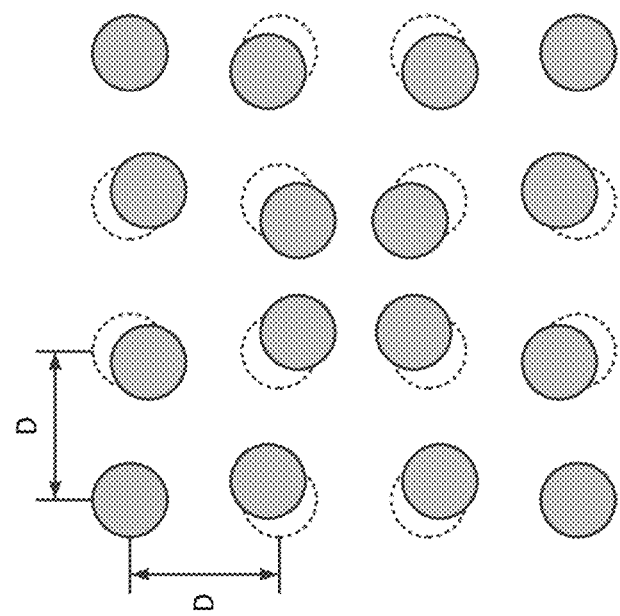
FIG. 14 shows an alternative antenna array in which antenna elements are displaced from their usual locations.

The calculations and figures described in the above paragraphs assume an original square grid and a single displacement parameter ΔD. There are many ways to achieve this displacement from a regular grid. As one alternative example to the arrangement shown in FIG. 11A, some elements may be moved away from their uniform grid locations to sit on concentric circles, as illustrated in FIG. 14. This provides similar results to the arrangement shown in FIG. 11A. The skilled person will appreciate that alternative element pitches and displacement will achieve the differences in directivity between the main beam and the grating lobe. For example, moving a single element in a direction that is nonparallel to the grid axis (i.e. nonparallel to the directions in which the elements are aligned) would result in a difference in directivity between the main beam and the largest grating lobe.

As another example, one or more of the antenna elements of a one-dimensional 4×1 antenna array (such as those commonly used in smartphones) may be displaced from a uniform 4×1 array (with equally spaced elements), so that the array has two pitch values. For example, the four antenna elements may be arranged using pitches of large-small-large or small-large-small.

Second Method—Exploiting Wideband Nature of Signals

A second method involves exploiting the wideband nature of the signals. This method is applicable to regular arrays but may also be applied to the previously described irregular arrays. Under this method, the array phase gradient is swept to exercise all possible beam directions, including those well outside the targeted scan range of the device. At the same time, the strength of the received signals is measured at the bottom edge and top edge of all available channels sent by the base station. In NR, the signal strength may be expressed in terms of RSRP (power of reference symbols embedded in the downlink signal) or RSRQ (a measure of received signal quality, similar to signal to interface and noise ratio, SINR). From the power versus angle responses, two likely beam angles can be identified by mathematically fitting the peaks of the responses against a suitable (near-parabolic) profile. The beam angle for which the estimates at the lower and upper band edge agree is the true angle of arrival. The beam angle where there is a (analytically predictable) discrepancy in estimated beam direction between the two frequency components cannot be the true angle of arrival, and is discarded.

Figure 15:
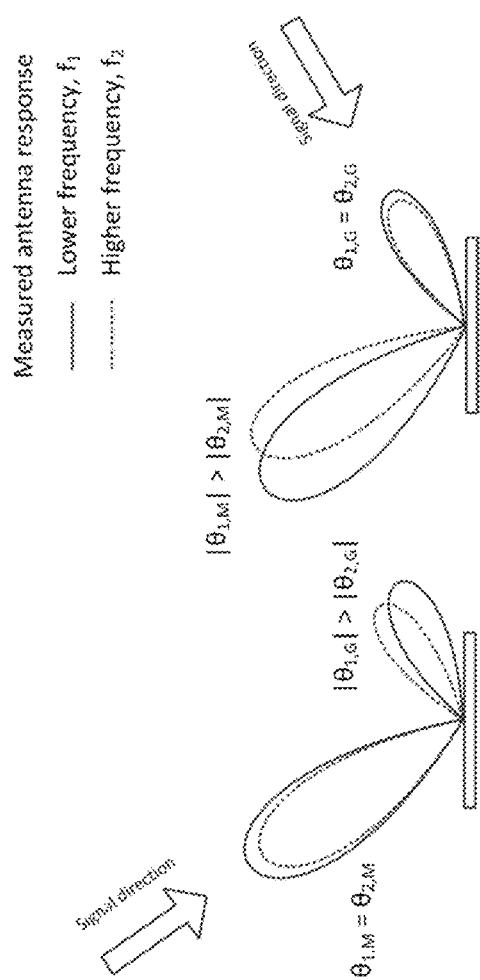
FIG. 15 shows antenna responses at two different frequencies.

This is illustrated schematically in FIG. 15. In the left-hand side case in FIG. 15, the true signal direction is from the left at a moderate angle to the array normal. In the case on the right-hand side in FIG. 15, however, the signal comes from a steeper angle corresponding to the grating lobe present when the antenna elements are set to precisely the same phases as in the left-hand case. The signal profiles received in these two cases are very similar, except that the calculated beam angles agree for all frequencies from the actual angle of arrival of the beam and show a slight frequency dispersion from the other possible inclination angles. This is shown from the dispersion in frequency at the angle corresponding to the grating lobe in the left-hand case in FIG. 15 and the dispersion in frequency at the angle corresponding to the main lobe in the right-hand case in FIG. 15.

Analytically, this can be understood as follows. The calculations assume a large 1D array, but the same equations hold in two dimensions as well, independently for each array dimension.

Assume the actual signal direction is θ. Therefore, the maximum power level is observed when $\Delta\varphi=2\pi\cdot(D/\lambda)\cdot\sin\theta$, where we assume the array is configured to sweep $-\pi<\Delta\varphi<+\pi$ ($-180°<\Delta\varphi<+180°$). For frequency components at the bottom of the band, the wavelength takes the value of $\lambda_1=c/f_1$, where c is the speed of electromagnetic radiation. For the upper frequencies, $\lambda_2=c/f_2$. Therefore, from a multitude of measurements, two slightly different beam configurations $\Delta\varphi_1$ and $\Delta\varphi_2$ are found to maximize received signal strength.

When the values $\Delta\varphi_1$ and $\Delta\varphi_2$ are used to calculate the beam direction, there may be two possible solutions to the coherency conditions, assuming the array design uses $\frac{1}{2}<D/\lambda<1$.

A first solution, corresponding to the direction of the main lobe and labelled with index M, is given by:

$$\theta_{1,M}=\arcsin(\lambda_1/D\cdot\Delta\varphi_1/2\pi), \text{ and}$$

$$\theta_{2,M}=\arcsin(\lambda_2/D\cdot\Delta\varphi_2/2\pi),$$

using the usual definition of arcsin( ) which returns an angle between $-\pi/2$ and $+\pi/2$ (between $-90°$ and $+90°$). This solution will return the candidate angle corresponding to the main lobe of the signal.

However, as long as $\Delta\varphi_1$ and $\Delta\varphi_2$ are large enough, specifically $|\Delta\varphi|>2\pi\cdot(1\cdot D/\lambda)$, there is a second set of possible solutions for the coherency conditions corresponding to the grating lobe and labelled with index G, as follows:

If $\Delta\varphi_1, \Delta\varphi_2<0$:

$$\theta_{1,G}=\arcsin(\lambda_1/D\cdot(\Delta\varphi_1+2\pi)/2\pi), \text{ and}$$

$$\theta_{2,G}=\arcsin(\lambda_2/D\cdot(\Delta\varphi_2+2\pi)/2\pi).$$

Or, if $\Delta\varphi_1, \Delta\varphi_2>0$:

$$\theta_{1,G}=\arcsin(\lambda_1/D\cdot(\Delta\varphi_1-2\pi)/2\pi), \text{ and}$$

$$\theta_{2,G}=\arcsin(\lambda_2/D\cdot(\Delta\varphi_2-2\pi)/2\pi).$$

If $\theta_{1,M}=\theta_{2,M}$ then the true angle of arrival is $\theta=\theta_{1,M}=\theta_{2,M}$, which will provide the result $\theta_{1,G}\neq\theta_{2,G}$ (i.e. the signal is received via the main lobe). Conversely, if $\theta_{1,G}=\theta_{2,G}$, then the true angle of arrival is $\theta=\theta_{1,G}=\theta_{2,G}$ with $\theta_{1,M}\neq\theta_{2,M}$ (i.e. the signal is received via the grating lobe).

Figure 16:
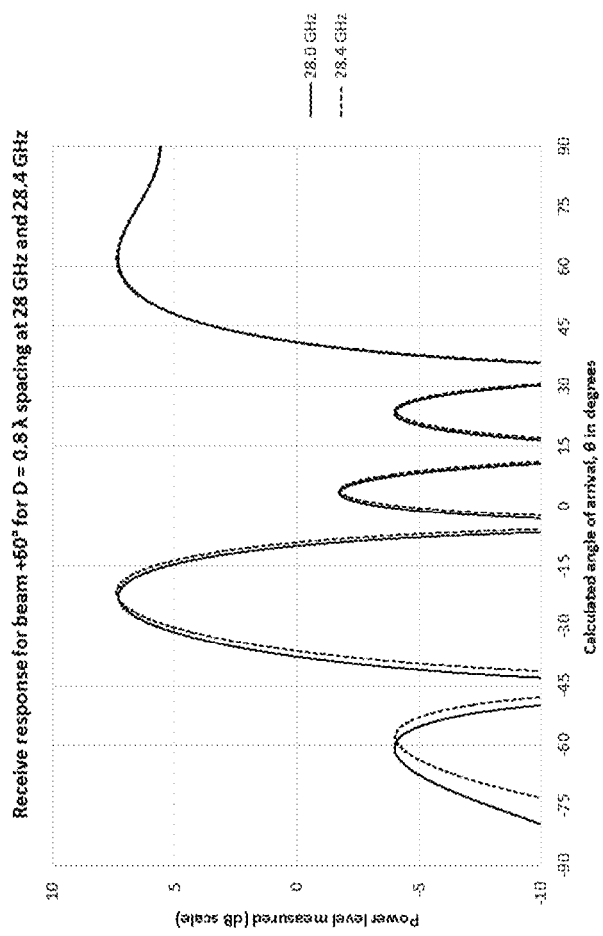
FIG. 16 is a graph of gain response against angle of arrival at two different frequencies.

The above analyses assume that only the principle beams formed by the arrays are considered, which are strongly dominant when the number of elements is large. Many practical arrays have a limited size which also creates a number of side beams at lower power levels. FIG. 16 shows a simulated response for a small array (4×4 elements), $D/\lambda=0.8$. Two frequencies at 28.0 GHz and 28.4 GHz are shown. The true signal angle meets the array at an angle of $\theta=60°$, corresponding to a grating lobe (as defined in FIG. 3). An image appears at around $-22.5°$ (corresponding to the main beam), but the frequency response is slightly shifted.

Aside from the main and grating lobes shown in FIG. 16, smaller side lobes are also visible. Their frequency dispersion can be even larger than that of the main lobe (shown, for example, by the frequency dispersion of the side lobe on the left-hand side of FIG. 16). However, as the power level of these side lobes is lower, they are not generally useful for measurements.

An alternative way of using the measurements of $\Delta\varphi_1$ and $\Delta\varphi_2$ that correspond to the peak power seen for frequencies $f_1$ and $f_2$ when sweeping the array phase gradient is now described. For $|\Delta\varphi|<2\pi\cdot(1\cdot D/\lambda)$, there is no angle ambiguity, as there is no grating lobe (again as shown in FIG. 3). For larger absolute values, the following rule applies:

If $\text{sign}(\Delta\varphi_2-\Delta\varphi_1)=\text{sign}(\Delta\varphi_1)=\text{sign}(\Delta\varphi_2)$ then the signal is received via the main beam, i.e. $|\theta|<\arcsin(\lambda/2D)$.

If $\text{sign}(\Delta\varphi_2-\Delta\varphi_1)\neq\text{sign}(\Delta\varphi_1)$ (or $\text{sign}(\Delta\varphi_2)$), then the signal is received through the grating lobe and $|\theta|>\arcsin(\lambda/2D)$.

This can be understood from the coherency condition when expressed in terms of frequency rather than bandwidth. That is: $\Delta\varphi_{1,2}=2\pi\cdot f_{1,2}\cdot(D/c)\cdot\sin\theta$. Without restricting generality, assume θ is positive. Then, as long as $\theta<\arcsin(\lambda/2D)$, i.e. the signal is received via the main beam, angles $\Delta\varphi_1$ and $\Delta\varphi_2$ are also positive. The derivative of the beam phase gradient with respect to frequency is also positive. For larger positive angles ($\theta>\arcsin(\lambda/2D)$, corresponding to the grating lobe), the sign of the array phase gradient switches to negative. However, the derivative with respect to frequency remains a positive number.

Looking more closely at the relationship between main lobe hypothesis $\theta_M$ and grating lobe hypothesis $\theta_G$ we find $|2\pi\cdot f\cdot D/c\,(\sin\theta_M-\sin\theta_G)|=2\pi$, as they both satisfy the coherency condition.

To discriminate between the two cases, the value of $(\Delta\varphi_2\cdot\Delta\varphi_1)$ must be determined. Unsurprisingly, this is proportional to the bandwidth of the signal $\delta f=f_2-f_1$. It can be found that the phase accuracy that must be achieved for making the distinction is given by $\delta\varphi=2\pi\,\delta f/f$. For example, for a 28 GHz signal with a bandwidth of 400 MHz, the beam peaks' locations must be measured with better than 5.1° accuracy. This corresponds almost precisely to the beam step size of a six-bit phase shifter ($360°/2^6=5.625°$).

However, using appropriate curve fitting and signal averaging, the peak beam angle can be determined to a finer precision that the array phase resolution. For example, the steeper flanks of the signal gain response will usually provide a more accurate view of the location of the peak than the broader peak.

Because of the small dispersion in frequency, this method is most useful for very wide signal bandwidths.

The phased array antennas described herein may be included in a device. The phased array antenna of the device may include a plurality of antenna elements (which may, for example, be arranged in a uniform pattern or in a non-uniform pattern such as the arrangements shown in FIG. 11A or 14). The device may further include a plurality of LEDs. The plurality of LEDs may be on an opposite side of the device to the antenna, and may assist a user with orientation of the device (e.g. as described above with respect to FIGS. 10A to 10C). The device may further comprise a processor. The device may be configured to receive a non-transitory computer-readable medium comprising instructions that, when executed by the processor, cause the device to carry out the methods described above. Upon processing the instructions, the device may output instructions for reorientation of the array via the plurality of LEDs on the device. Alternatively, or additionally, the device may further be configured to communicate with an external device such as a smartphone via a communications interface such as a Bluetooth (or similar) interface. Consequently, upon processing the instructions, the device may send instructions for reorientation of the array to the external device. The user may then view the instructions for reorientation of the array via a user interface on the external device.

The described methods may be implemented using computer executable instructions. A computer program product or computer readable medium may comprise or store the computer executable instructions. The computer program product or computer readable medium may comprise a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). A computer program may comprise the computer executable instructions. The computer readable medium may be a tangible or non-transitory computer readable medium. The term "computer readable" encompasses "machine readable".

The singular terms "a" and "an" should not be taken to mean "one and only one". Rather, they should be taken to mean "at least one" or "one or more" unless stated otherwise. The word "comprising" and its derivatives including "comprises" and "comprise" include each of the stated features, but does not exclude the inclusion of one or more further features.

The above implementations have been described by way of example only, and the described implementations are to be considered in all respects only as illustrative and not restrictive. It will be appreciated that variations of the described implementations may be made without departing from the scope of the invention. It will also be apparent that there are many variations that have not been described, but that fall within the scope of the appended claims.

The invention claimed is:

1. A method for installation of a phased array antenna receiving a signal, the method comprising:
   determining that a higher directivity of the phased array antenna is achievable;
   determining an orientation of the phased array antenna at which the higher directivity is achievable; and
   providing instructions for adjusting the orientation of the phased array antenna from an initial orientation to the determined orientation.

2. A method according to claim 1, wherein determining that a higher directivity of the phased array antenna comprises:
   determining that the signal is received via a grating lobe of the phased array antenna.

3. A method according to claim 1, wherein the orientation of the phased array antenna at which the higher directivity is achievable is an orientation at which the signal is received via a main lobe of the phased array antenna.

4. A method according to claim 2, wherein determining that the signal is received via a grating lobe of the phased array antenna comprises:
   receiving the signal at the phased array antenna, wherein the phased array antenna comprises a plurality of antenna elements, and wherein a first spacing between a first antenna element and a second antenna element adjacent to the first antenna element in a first direction is different to a second spacing between the second antenna element and a third antenna element adjacent to the second antenna element in the first direction.

5. A method according to claim 4, wherein determining that the signal is received via a grating lobe of the phased array antenna comprises:
   measuring the received power of the signal, wherein the signal is detected by applying a first set of phase offsets corresponding to a main lobe of the phased array antenna;
   measuring the received power of the signal received by applying a second set of phase offsets corresponding to a grating lobe of the phased array antenna; and
   determining that the signal is received via the grating lobe if the received power of the signal is higher when the second set of phase offsets is applied.

6. A method according to claim 1, wherein the phased array antenna is included in a device comprising a plurality of LEDs, and wherein providing instructions for adjusting the orientation of the phased array antenna comprises illuminating at least one of the plurality of LEDs.

7. A method according to claim 1, wherein the phased array antenna is included in a device, the device in communication with an external device comprising a user interface, and wherein providing instructions for adjusting the orientation of the phased array antenna comprises providing instructions via the user interface of the external device.

8. A method according to claim 7, wherein the external device is a smartphone.

9. A method according to claim 2, wherein determining that the signal is received via a grating lobe of the phased array antenna comprises:
   determining a first phase offset that maximizes the received power of a first signal having a first frequency; and
   determining a second phase offset that maximizes the received power of a second signal having a second frequency greater than the first frequency;
   determining the difference between the second phase offset and the first phase offset; and
   determining that the sign of the difference between the second phase offset and the first phase offset is not equal to the sign of the first phase offset or the sign of the second phase offset.

10. A method according to claim 1, wherein determining that a higher directivity of the phased array antenna is achievable comprises:
    determining that the signal is a reflected signal; and
    determining that the phased array antenna can be reoriented to receive a non-reflected signal.

11. A method according to claim 10, wherein determining that the signal is a reflected signal comprises determining that a higher directivity is achievable at the phased array antenna by optimizing the received power of a candidate signal path and the received signal quality (RSQ) of the candidate signal path.

12. A method according to claim 1, wherein the signal is a first signal received from a first base station at a first angle of arrival, and wherein determining that a higher directivity of the phased array antenna is achievable comprises:
    receiving a second signal from a second base station at a second angle of arrival;
    determining a normalized signal power of the first signal to account for the first angle of arrival;
    determining a normalized signal power of the second signal to account for the second angle of arrival; and
    determining that the normalized signal power of the second signal exceeds the normalized signal power of the first signal.

13. A method according to claim 12, wherein determining the normalized signal power of the first signal comprises dividing the received power of the first signal by the antenna gain corresponding to the first angle of arrival.

14. A non-transitory computer-readable medium comprising instructions that, when executed by a processor of a device, cause the device to carry out a method according to claim 1.

* * * * *